United States Patent
Maurizio

(10) Patent No.: US 9,915,272 B2
(45) Date of Patent: Mar. 13, 2018

(54) TURBOMACHINE BLADE AND RELATIVE PRODUCTION METHOD

(71) Applicant: PIETRO ROSA T.B.M. S.r.l., Maniago (IT)

(72) Inventor: Andrea Maurizio, Cavasso Nuovo (IT)

(73) Assignee: PIETRO ROSA T.B.M. S.R.L., Maniago (IT)

( * ) Notice: Subject to any disclaimer, the term of this patent is extended or adjusted under 35 U.S.C. 154(b) by 3 days.

(21) Appl. No.: 15/237,474

(22) Filed: Aug. 15, 2016

(65) Prior Publication Data

US 2017/0152863 A1 Jun. 1, 2017

Related U.S. Application Data

(62) Division of application No. 14/194,369, filed on Feb. 28, 2014, now Pat. No. 9,624,783.

(30) Foreign Application Priority Data

Feb. 28, 2013 (IT) .............. TV2013A0031

(51) Int. Cl.

| F04D 19/00 | (2006.01) |
|---|---|
| F04D 29/54 | (2006.01) |
| F04D 29/02 | (2006.01) |
| F04D 29/64 | (2006.01) |

(Continued)

(52) U.S. Cl.
CPC ............ *F04D 29/544* (2013.01); *B23P 15/04* (2013.01); *F02K 3/06* (2013.01); *F04D 19/002* (2013.01); *F04D 29/023* (2013.01); *F04D 29/644* (2013.01); *F05D 2220/323* (2013.01); *F05D 2230/10* (2013.01); *F05D 2230/232* (2013.01); *F05D 2230/51* (2013.01);

(Continued)

(58) Field of Classification Search
CPC . F01D 5/147; F01D 5/225; F01D 5/22; F01D 5/30; F05D 2230/00; F05D 2230/232; B23P 15/04; Y10T 29/49337
USPC .................. 416/191, 214 R, 232; 228/112.1; 29/889.71
See application file for complete search history.

(56) References Cited

U.S. PATENT DOCUMENTS

| 2,675,208 A | 4/1954 | Weinberg |
|---|---|---|
| 3,044,746 A | 7/1962 | Stargardter |
| 4,012,616 A | 3/1977 | Zelahy |

(Continued)

FOREIGN PATENT DOCUMENTS

| EP | 1 983 160 A2 | 10/2008 |
|---|---|---|
| EP | 2 362 066 A2 | 8/2011 |

(Continued)

*Primary Examiner* — Matthew W Jellett
(74) *Attorney, Agent, or Firm* — Seed IP Law Group LLP

(57) ABSTRACT

A turbomachine blade of the type having a metal lower coupling root, a metal upper coupling head, and a metal airfoil-shaped oblong member designed to connect the coupling root rigidly to the coupling head; the airfoil-shaped oblong member having a substantially airfoil-shaped main plate-like element connected to the coupling root and to the coupling head, and which is divided into: a lower connecting fin cantilevered from and formed in one piece with the coupling root; an upper connecting fin cantilevered from and formed in one piece with the coupling head; and a center plate-like body, which is located between the lower and upper connecting fins, is shaped/designed to form an extension of the lower and upper connecting fins, and is butt-welded to, to form one piece with, the lower and upper connecting fins.

10 Claims, 7 Drawing Sheets

(51) Int. Cl.
 *F02K 3/06* (2006.01)
 *B23P 15/04* (2006.01)
(52) U.S. Cl.
 CPC .. *F05D 2240/125* (2013.01); *F05D 2300/173* (2013.01); *F05D 2300/174* (2013.01)

(56) References Cited

U.S. PATENT DOCUMENTS

| | | |
|---|---|---|
| 5,269,058 A | 12/1993 | Wiggs et al. |
| 5,933,951 A | 8/1999 | Bergue et al. |
| 6,616,408 B1 | 9/2003 | Meier |
| 7,189,064 B2 | 3/2007 | Helder et al. |
| 7,650,773 B2 | 1/2010 | Shikano et al. |
| 8,083,489 B2 | 12/2011 | Viens et al. |
| 8,267,663 B2 | 9/2012 | Larose et al. |
| 8,821,124 B2 | 9/2014 | Viens et al. |
| 2006/0039792 A1 | 2/2006 | Ferte et al. |
| 2009/0277009 A1 | 11/2009 | Kotzbacher et al. |
| 2010/0068550 A1 | 3/2010 | Watson et al. |
| 2010/0116013 A1 | 5/2010 | Brennand |
| 2011/0005075 A1 | 1/2011 | Trewiler et al. |
| 2011/0211965 A1 | 9/2011 | Deal et al. |
| 2011/0268562 A1 | 11/2011 | Knight, III et al. |
| 2012/0205348 A1 | 8/2012 | Romanelli et al. |
| 2012/0224972 A1 | 9/2012 | Stiehler et al. |
| 2013/0319010 A1 | 12/2013 | Hui et al. |

FOREIGN PATENT DOCUMENTS

| | | |
|---|---|---|
| GB | 679931 | 9/1952 |
| GB | 791751 | 3/1958 |

TURBOMACHINE BLADE AND RELATIVE PRODUCTION METHOD

BACKGROUND

Technical Field

The present disclosure relates to a turbomachine blade and relative production method.

More specifically, the present disclosure relates to a method of producing a lightweight stator blade for a compressor or front fan of an aircraft turbine engine, to which use the following description refers purely by way of example.

Description of the Related Art

As is known, stator blades of aircraft turbine engine compressors substantially comprise a coupling root designed to fit and lock rigidly to the compressor hub or center blade mounting disk; an airfoil-shaped oblong member, which cantilevers from the coupling root, so as to cantilever radially outwards of the hub or blade mounting disk when the coupling root is fixed inside the hub or center blade mounting disk; and an upper coupling head, which is located at the distal end of the airfoil-shaped oblong member, i.e. at the opposite end to the coupling root, and is designed to fit and lock rigidly to the outer blade mounting ring of the compressor.

Having to withstand fairly severe mechanical stress and heat, the lower coupling root, the airfoil-shaped oblong member, and the upper coupling head of the blade are usually formed in one piece from a single block of high-strength metal, which is forged and then milled to shape the blade as required.

To reduce inertia and the overall weight of turbine engines, some aircraft turbine engine manufacturers have opted over the past few years to employ blades with hollow airfoil-shaped oblong members in parts of the engine, so as to drastically reduce the amount of metal needed to make the blade.

Patent Application US2006/039792 describes a method of producing a lightweight aircraft turbine engine blade.

Making a lightweight blade from a single block of metal, however, is an expensive, extremely painstaking, time-consuming job, due to the large amount of material the numeric-control milling machine has to remove to achieve the required shape of the piece.

BRIEF SUMMARY

It is therefore an object of the present disclosure to provide a method of producing a lightweight turbomachine blade, designed to significantly reduce the cost of manufacturing blades of this type.

According to the present disclosure, there is provided a turbomachine blade as defined in claim 1 and preferably, though not necessarily, in any one of the claims dependent on claim 1.

According to the present disclosure, there is also provided a method of producing a turbomachine blade, as defined in claim 5 and preferably, though not necessarily, in any one of the claims dependent on claim 5.

BRIEF DESCRIPTION OF THE SEVERAL VIEWS OF THE DRAWINGS

A non-limiting embodiment of the present disclosure will be described by way of example with reference to the attached drawings, in which.

DETAILED DESCRIPTION

Figure 1:
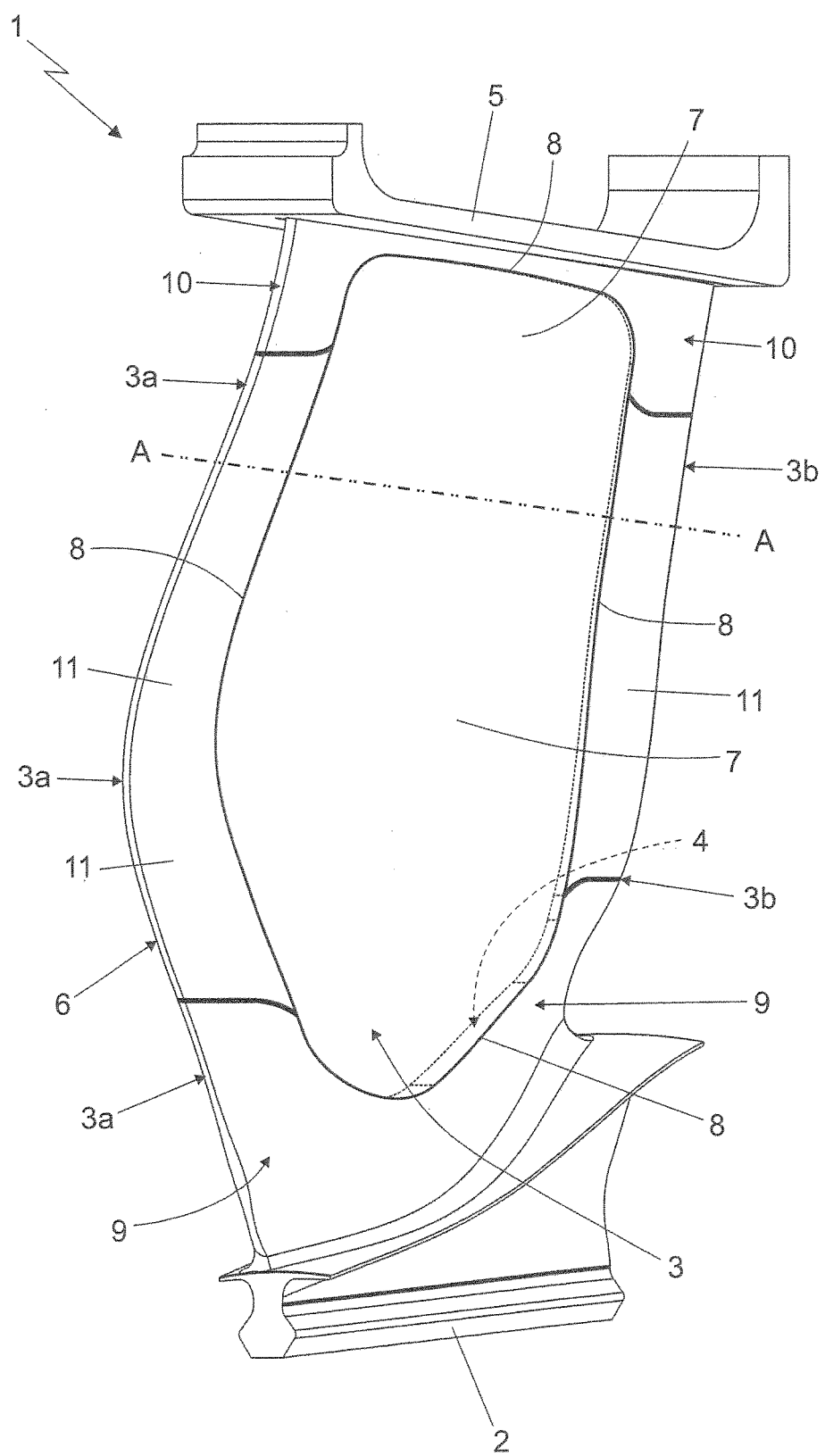
FIG. 1 shows a view in perspective of a lightweight turbomachine blade in accordance with the teachings of the present disclosure.
Figure 2:
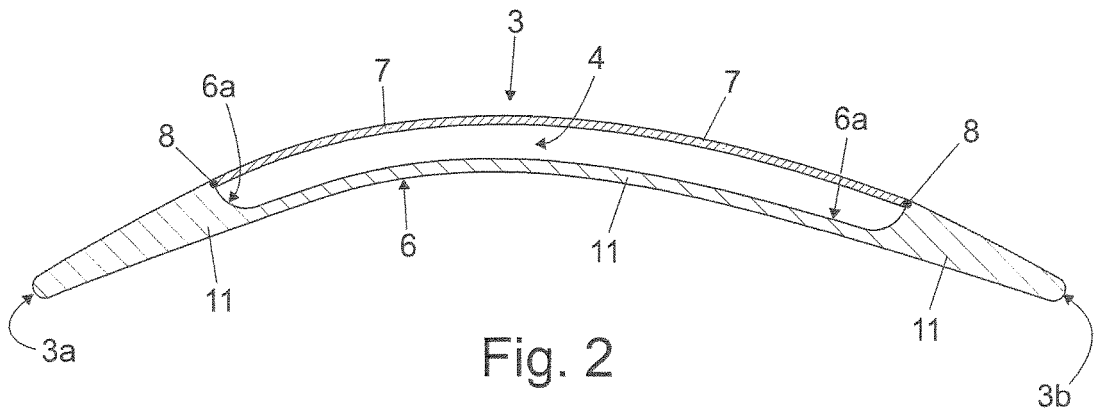
FIG. 2 shows a section along line A-A of the FIG. 1 blade.
Figure 3:
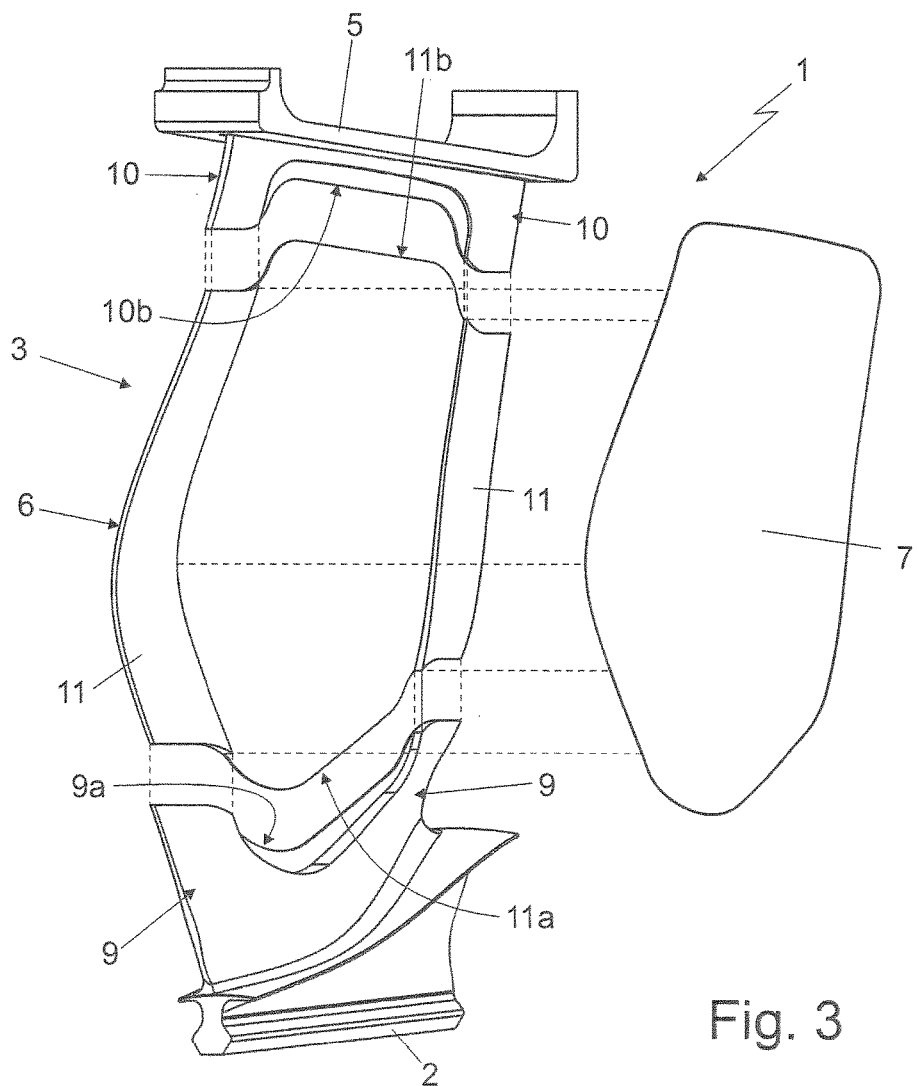
FIG. 3 shows an exploded view in perspective of the FIG. 1 blade.

With reference to FIGS. 1, 2 and 3, number 1 indicates as a whole a lightweight turbomachine stator blade, which may be used to advantage, for example, in the compressor or front fan of a preferably, though not necessarily, aircraft turbine engine.

Blade 1 is made of metal, and substantially comprises: a lower coupling root 2 designed to fit and lock rigidly to the turbine engine center blade mounting hub (not shown); an airfoil-shaped oblong member 3 which cantilevers from coupling root 2, so as to cantilever substantially radially outwards of the blade mounting hub (not shown) when coupling root 2 is fixed inside the center blade mounting hub, and which inside has a large closed weight-reducing cavity 4, the three-dimensional shape of which preferably, though not necessarily, substantially reproduces, to a smaller scale, the three-dimensional shape of airfoil-shaped oblong member 3 as a whole; and an upper coupling head 5, which is located at the second end of airfoil-shaped oblong member 3, i.e. at the opposite end to coupling root 2, and is designed to fit and lock rigidly to the turbine engine outer blade mounting ring (not shown).

In other words, airfoil-shaped oblong member 3 is designed to joint/connect coupling root 2 rigidly to coupling head 5.

In the example shown, in particular, coupling root 2, airfoil-shaped oblong member 3, and coupling head 5 are preferably, though not necessarily, made of titanium alloy, aluminum alloy, or special high-strength steel.

Airfoil-shaped oblong member 3, in turn, is made up of a substantially airfoil-shaped, main plate-like element 6, which connects directly to coupling root 2 and coupling head 5, and which, substantially in the center of one of its two major faces, has at least one hollow weight-reducing seat 6a of predetermined shape, which preferably extends over more than 40% of the total area of the major face of main plate-like element 6; and of a cover plate 7 which closes, preferably hermetically, the opening of hollow seat 6a to form the inner cavity 4 and complete the outer profile of airfoil-shaped oblong member 3.

More specifically, in the example shown, cover plate 7 is preferably complementary in shape to the opening of hollow seat 6a, and is fixed irremovably to the opening of hollow seat 6a in main plate-like element 6 by a weld bead 8 preferably extending seamlessly along the whole peripheral edge of cover plate 7.

Preferably, though not necessarily, the shape of hollow seat 6a also roughly reproduces, to a smaller scale, the three-dimensional shape of airfoil-shaped oblong member 3 as a whole.

As shown in FIGS. 1, 2 and 3, main plate-like element 6 in turn is divided into a lower connecting fin 9, which cantilevers from coupling root 2 towards coupling head 5 and is formed in one piece with coupling root 2; an upper connecting fin 10, which cantilevers from coupling head 5 towards coupling root 2 and is formed in one piece with coupling head 5; and a center plate-like body 11, which is located between the two connecting fins 9 and 10, is shaped/designed to form an extension of connecting fins 9 and 10, and is butt-welded to, to form one piece with, connecting fins 9 and 10. Center plate-like body 11 is also shaped to at least partly bound/form hollow seat 6a of main plate-like element 6.

More specifically, the lower edge 11a of center plate-like body 11 and the ridge 9a of lower connecting fin 9 are complementary in shape, and are butt welded to each other so that center plate-like body 11 forms one piece with lower connecting fin 9; and the upper edge 11b of center plate-like body 11 and the ridge 10b of upper connecting fin 10 are complementary in shape, and are butt welded to each other so that center plate-like body 11 forms one piece with upper connecting fin 10.

More specifically, lower edge 11a of center plate-like body 11 and ridge 9a of lower connecting fin 9 extend from the leading edge 3a to the trailing edge 3b of airfoil-shaped oblong member 3 along a curved, substantially Ω (omega) shaped path.

Likewise, upper edge 11b of center plate-like body 11 and ridge 10b of upper connecting fin 10 extend from the leading edge 3a to the trailing edge 3b of airfoil-shaped oblong member 3 along a curved, substantially Ω (omega) shaped path.

Figure 4:
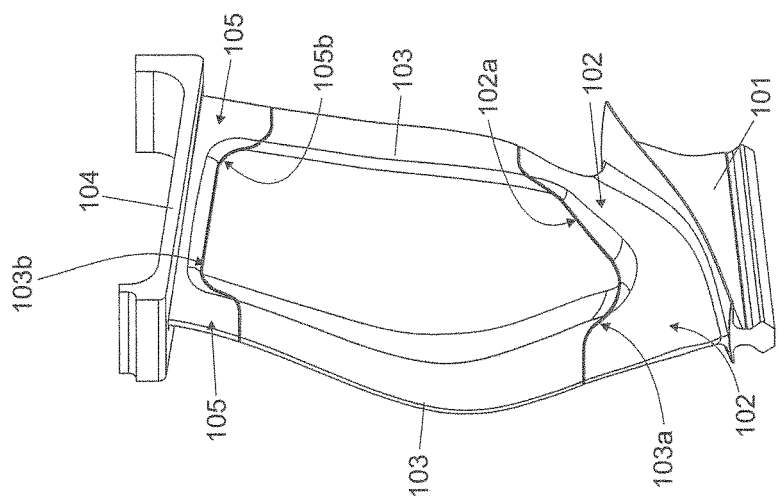
FIGS. 4 to 12 show schematics of steps in the method of producing the lightweight turbomachine blade in FIGS. 1, 2 and 3.
Figure 5:
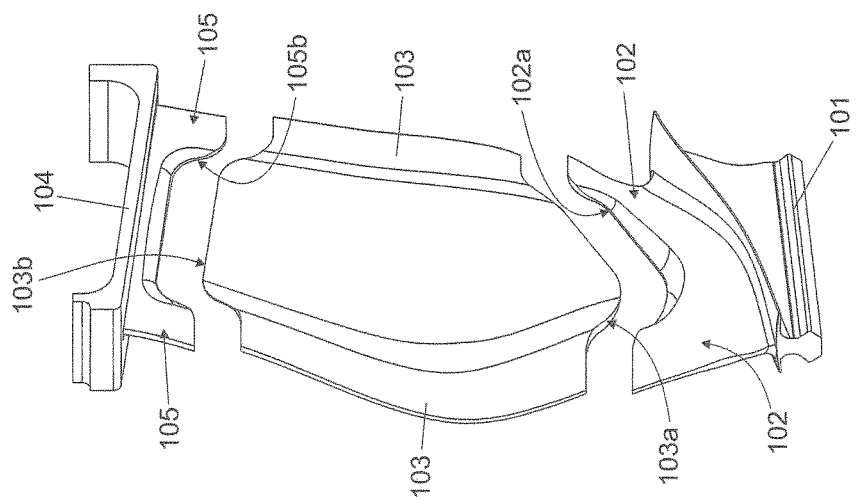

With reference to FIGS. 4 and 5, the method of producing lightweight blade 1 comprises:
  making, preferably by milling and/or stamping and/or forging and/or die-casting, a first semifinished metal part 101, the three-dimensional shape of which over-approximates the shape of coupling root 2 of blade 1, and which also has a projecting appendage 102, the three-dimensional shape of which over-approximates the shape of lower connecting fin 9;
  making, preferably by forming and/or stamping and/or bending and/or forging and/or die-casting, a plate-like second semifinished metal part 103, the three-dimensional shape of which over-approximates the shape of center plate-like body 11 of main plate-like element 6, including the depression formed by hollow seat 6a; and
  making, preferably by milling and/or stamping and/or forging and/or die-casting, a third semifinished metal part 104, the three-dimensional shape of which over-approximates the shape of coupling head 5 of blade 1, and which also has a projecting appendage 105, the three-dimensional shape of which over-approximates the shape of upper connecting fin 10.

As used herein, "over-approximates" and "over-approximating" refer to approximating with a larger value or size.

With reference to FIGS. 4 and 5, the method of producing blade 1 then comprises:
  shaping the lower edge 103a of plate-like semifinished part 103 and the ridge 102a of projecting appendage 102 of semifinished part 101, so that the lower edge 103a of plate-like semifinished part 103 and the ridge 102a of projecting appendage 102 are complementary in shape;
  placing the lower edge 103a of plate-like semifinished part 103 on the ridge 102a of projecting appendage 102, so that plate-like semifinished part 103 is aligned locally with projecting appendage 102; and
  butt-welding the lower edge 103a of plate-like semifinished part 103 to ridge 102a of projecting appendage 102 to connect the two parts rigidly to each other.

More specifically, in the example shown the method of producing blade 1 preferably comprises shaping the lower edge 103a of plate-like semifinished part 103 and the ridge 102a of projecting appendage 102 of semifinished part 101, so that they extend from the leading edge 3a to the trailing edge 3b of airfoil-shaped oblong member 3 along a curved, substantially Ω (omega) shaped path.

Still with reference to FIGS. 4 and 5, the method of producing blade 1 moreover comprises:
  shaping the upper edge 103b of plate-like semifinished part 103 and the ridge 105b of projecting appendage 105 of semifinished part 104, so that the upper edge 103b of plate-like semifinished part 103 and the ridge 105b of projecting appendage 105 are complementary in shape;
  placing the upper edge 103b of plate-like semifinished part 103 on the ridge 105b of projecting appendage 105, so that plate-like semifinished part 103 is aligned locally with projecting appendage 105; and
  butt-welding the upper edge 103b of plate-like semifinished part 103 to ridge 105b of projecting appendage 105 of semifinished part 104 to connect the two parts rigidly to each other.

More specifically, in the example shown, the method of producing blade 1 preferably comprises shaping the upper edge 103b of plate-like semifinished part 103 and the ridge 105b of projecting appendage 105, so that they extend from the leading edge 3a to the trailing edge 3b of airfoil-shaped oblong member 3 along a curved, substantially Ω (omega) shaped path.

Figure 6:
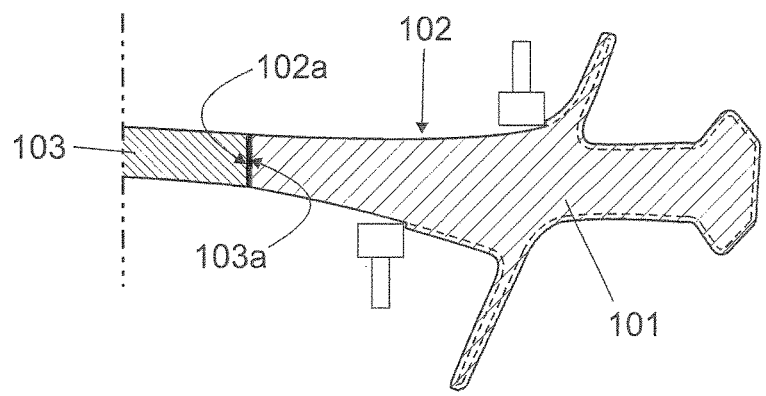
Figure 7:
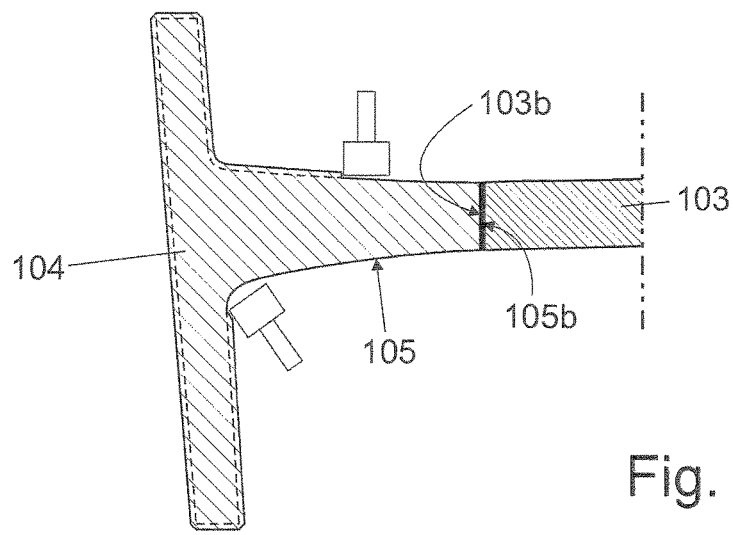
Figure 8:
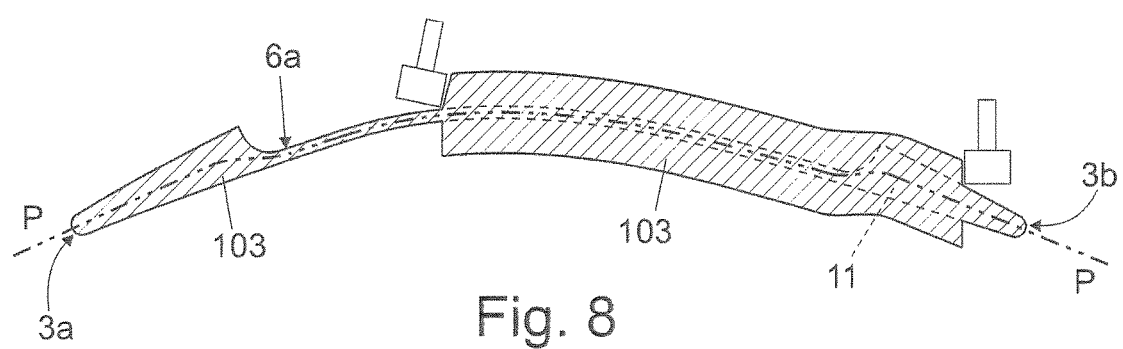

With reference to FIGS. 6, 7 and 8, after welding lower edge 103a of plate-like semifinished part 103 to ridge 102a of projecting appendage 102, and upper edge 103b of plate-like semifinished part 103 to ridge 105b of projecting appendage 105, the method of producing blade 1 comprises trimming/machining, by milling or other material-removing machining operation, the excess material off the resulting part to obtain coupling root 2, main plate-like element 6 of airfoil-shaped oblong member 3, and coupling head 5 of blade 1 of the desired shape.

More specifically, during the step of removing excess material from the part formed by butt-welding plate-like semifinished part 103 to the two semifinished parts 101 and 104, the method of producing blade 1 comprises:
  trimming/machining, by milling or other material-removing machining operation, excess metal off the two semifinished parts 101 and 104, to obtain coupling root 2 and coupling head 5 respectively of lightweight blade 1; and/or
  trimming/machining, by milling or other material-removing machining operation, excess metal off the long side edges of plate-like semifinished part 103 and the two projecting appendages 102 and 105, so as to form leading edge 3a and trailing edge 3b of airfoil-shaped oblong member 3; and/or
  trimming/machining, by milling or other material-removing machining operation, excess metal off the two major faces of plate-like semifinished part 103 and the two major faces of projecting appendages 102 and 105, to obtain main plate-like element 6 of airfoil-shaped oblong member 3, together with hollow, weight-reducing seat 6a.

Figure 9:
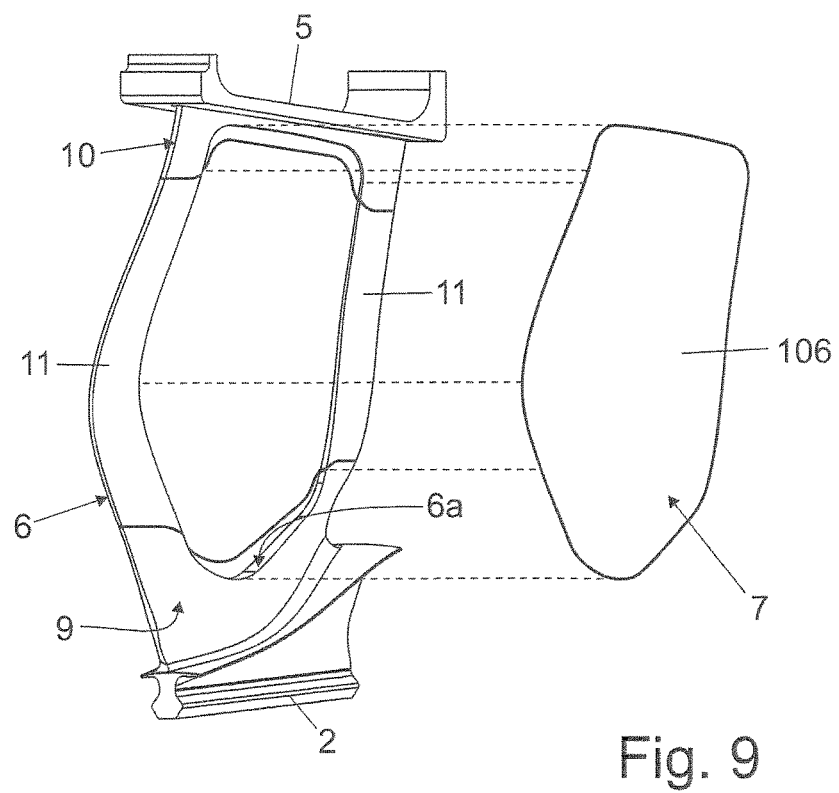

With reference to FIG. 9, after removing excess material from the part formed by butt welding plate-like semifinished part 103 to the two semifinished parts 101 and 104, the method of producing blade 1 comprises closing the opening of hollow seat 6a, formed in one of the two faces of main plate-like element 6, by means of cover plate 7, so as to form inner cavity 4 and complete the outer profile of airfoil-shaped oblong member 3.

More specifically, the method of producing blade 1 preferably comprises:

making a second plate-like element 106 complementary in shape to the opening of hollow seat 6a in the face of main plate-like element 6, and the thickness of which is less than the depth of hollow seat 6a;

placing plate-like element 106 on the face of main plate-like element 6, in which hollow seat 6a is formed, so as to seal the opening of hollow seat 6a; and fixing plate-like element 106 irremovably to main plate-like element 6.

Plate-like element 106 obviously forms the cover plate 7 of airfoil-shaped oblong member 3 of blade 1.

In the example shown, the method of producing blade 1 preferably comprises fixing plate-like element 106 irremovably to main plate-like element 6 by means of a weld bead preferably extending seamlessly along the entire peripheral edge of plate-like element 106; and then trimming/machining, by milling or other material-removing machining operation, excess metal off the weld between plate-like element 106 and main plate-like element 6.

Moreover, in the example shown, the method of producing lightweight blade 1 comprises making plate-like element 106 by cutting a plate portion, complementary in shape to the contour of the opening of hollow seat 6a, from a large flat, preferably 2-4 mm (millimeter) thick metal sheet (not shown).

Preferably, though not necessarily, the method of producing blade 1 comprises obtaining the plate-like semifinished part 103 from a flat metal plate 107 of substantially constant thickness s greater than the maximum thickness of center plate-like body 11 of blade 1, and with a contour over-approximating the flat, spread-out contour of center plate-like body 11; and by twisting and curving the flat plate 107 by means of a sheet metal forming process (i.e. by press-forming it with no appreciable reduction in its nominal thickness) to obtain the plate-like semifinished part 103 of the desired shaped.

Figure 10:
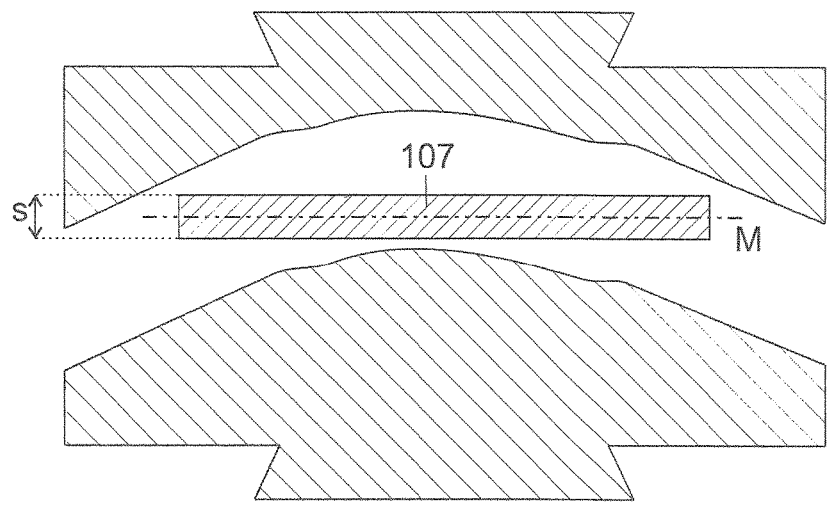
Figure 11:
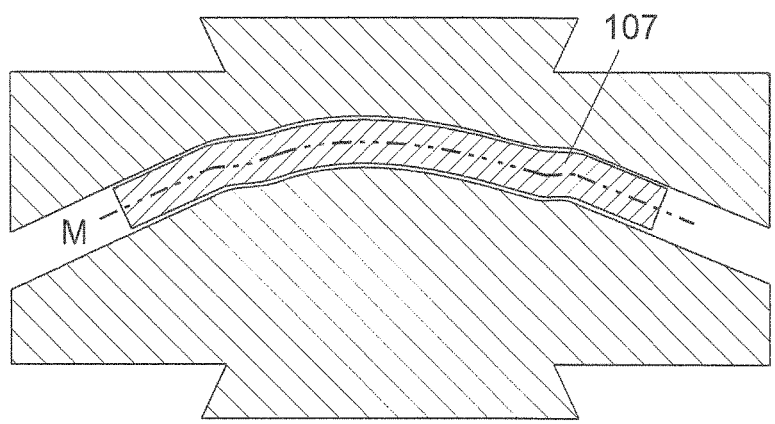
Figure 12:
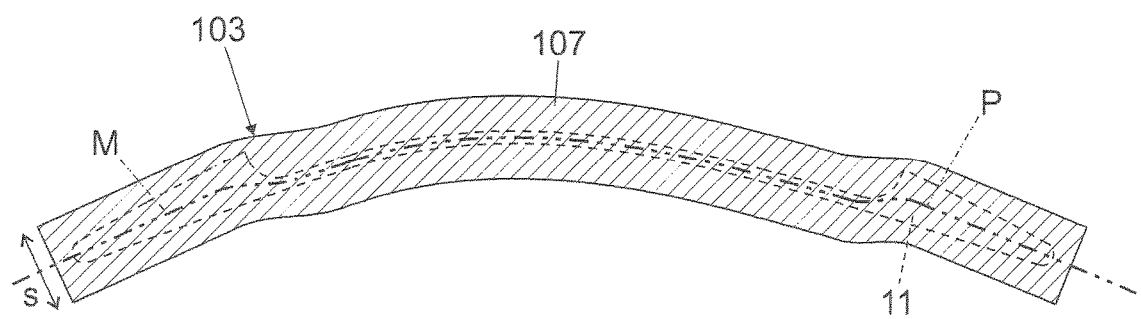

More specifically, with reference to FIGS. 10, 11 and 12, the method of producing blade 1 preferably comprises:

making a flat metal plate 107 of substantially constant thickness s greater than the maximum thickness of center plate-like body 11 of blade 1, and with a contour over-approximating the flat, spread-out contour of center plate-like body 11; and twisting and curving flat plate 107 by means of a sheet metal forming process (i.e. press-forming with no appreciable reduction in the nominal thickness of the plate), so that the final three-dimensional shape of the centerline plane M of flat plate 107 substantially matches the three-dimensional shape of the centerline plane P of center plate-like body 11 of main plate-like element 6.

Where the 'centerline plane' is the locus/set of points inside the center plate-like body, which are locally equidistant from the surfaces forming the two major faces of the center plate-like body.

Obviously, the three-dimensional shape of the centerline plane P of center plate-like body 11 is a function of the shape of hollow weight-reducing seat 6a.

In the example shown, in particular, thickness s of flat plate 107 preferably over-approximates the maximum thickness of center plate-like body 11 of blade 1 to be obtained.

More specifically, the difference between the thickness s of flat plate 107 and the maximum thickness of center plate-like body 11 is preferably less than 2 mm (millimeters).

Preferably, though not necessarily, the thickness s of flat plate 107 ranges between 5 mm and 40 mm (millimeters).

In the example shown, the flat metal plate 107 of constant thickness over-approximating the maximum thickness of center plate-like body 11, is preferably obtained by appropriately cutting a large flat metal plate (not shown) of constant thickness greater than the maximum thickness of center plate-like body 11 of main plate-like element 6.

In other words, the method of producing blade 1 comprises cutting, from a large flat metal plate (not shown) of constant thickness over-approximating the maximum thickness of center plate-like body 11, a plate portion with a contour over-approximating the flat, spread-out contour of center plate-like body 11, to obtain flat plate 107.

The method of producing blade 1 as described above has numerous advantages.

Firstly, making blade 1 from four different, completely separate semifinished parts 101, 103, 104, 106 allows each of semifinished parts 101, 103, 104, 106 to be produced using the production process best suited to its three-dimensional shape and desired mechanical characteristics.

Moreover, making plate-like semifinished part 103 by sheet metal forming (i.e. press-forming with no appreciable reduction in nominal thickness of the plate) a flat metal plate 107 of substantially constant thickness s greater than the maximum thickness of center plate-like body 11 of blade 1, and with a contour over-approximating the flat, spread-out contour of center plate-like body 11, allows to drastically reduce the manufacturing cost of blade 1. Forming a flat plate 107, in fact, is a processing technique that requires much less energy than forging, with all the advantages this entails.

Furthermore, the choice of twisting and curving the flat plate 107 so that the final three-dimensional shape of the centerline plane M of the plate substantially matches the three-dimensional shape of the centerline plane P of the center plate-like body 11, allows to minimize the amount of metal that has to be milled or otherwise machined off the plate-like semifinished part 103 to obtain the center plate-like body 11.

Clearly, changes may be made to blade 1, and to the method of producing it, without however departing from the scope of the present disclosure.

Figure 13:
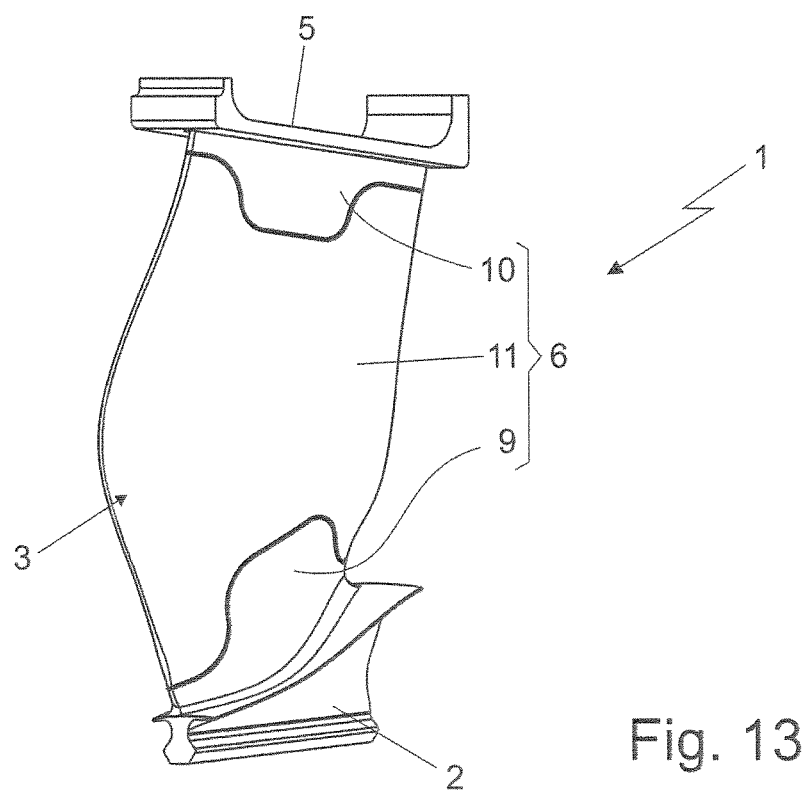
FIG. 13 shows a view in perspective of a further embodiment of the turbomachine blade shown in the above drawings.

For example, as shown in FIG. 13, in a different embodiment of blade 1, the airfoil-shaped oblong member 3 has no weight-reducing cavity 4.

In other words, the main plate-like element 6 of airfoil-shaped oblong member 3 has no hollow seat 6a and cover plate 7 is missing.

Consequently, the airfoil-shaped oblong member 3 is simply defined by a main plate-like element 6 with no hollow seat 6a, and which is made up of a lower connecting fin 9 cantilevered from coupling root 2 towards coupling head 5 and formed in one piece with coupling root 2; of an upper connecting fin 10 cantilevered from coupling head 5 towards coupling root 2 and formed in one piece with coupling head 5; and of a center plate-like body 11 shaped and located between connecting fins 9 and 10 to form an extension of the two fins, and which is butt-welded to, to form one piece with, connecting fins 9 and 10.

In this embodiment, the method of producing blade 1 therefore does not comprise making a plate-like element 106 for sealing the opening of hollow seat 6a in the face of main plate-like element 6.

In a further not-shown embodiment of blade 1, coupling root 2 of blade 1, rather than being structured so as to be fitted and locked rigidly to the center blade-mounting hub of the turbine engine (not shown), may be designed for being welded directly to the center blade-mounting hub of the turbine engine (not shown).

Figure 14:
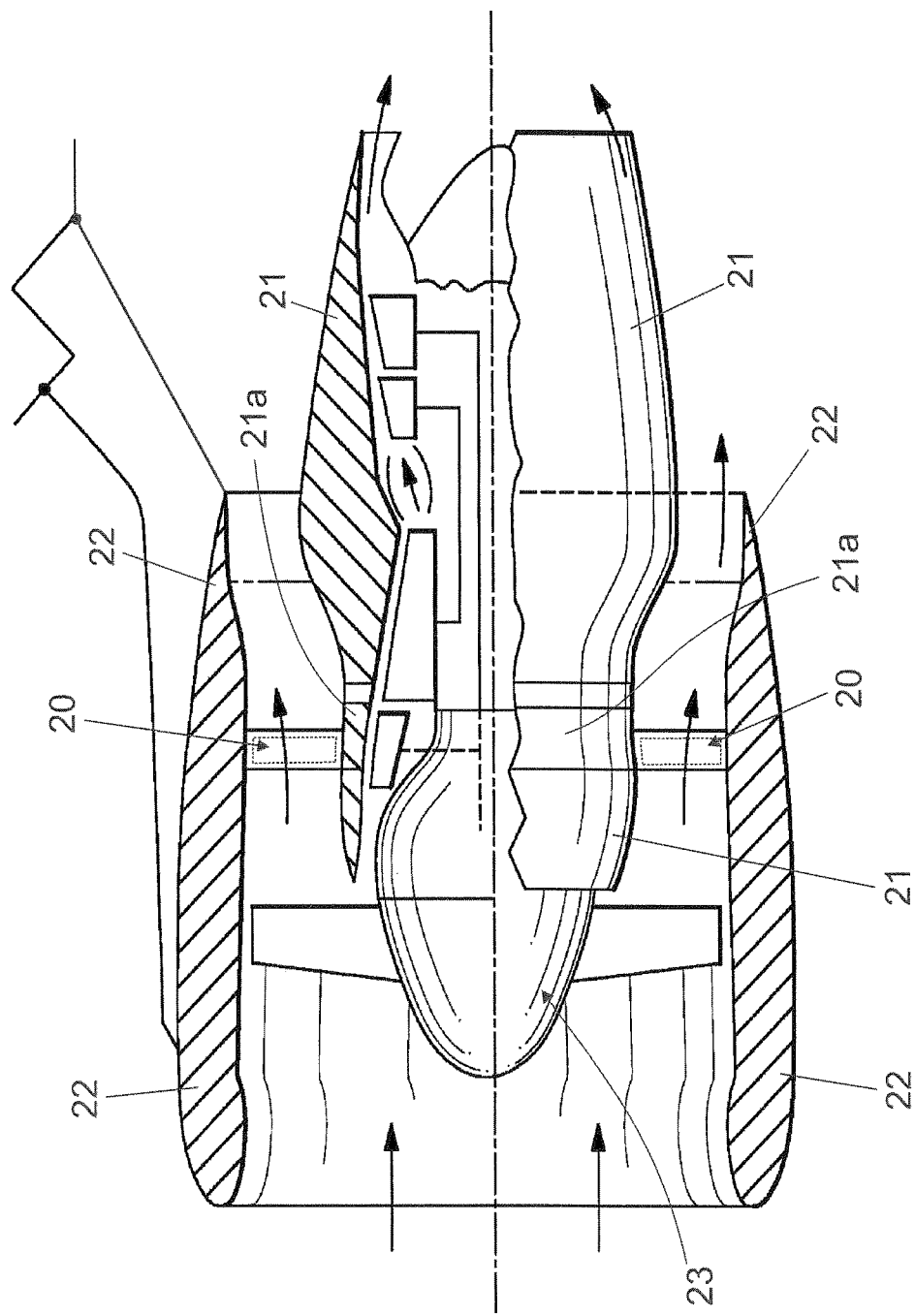
FIG. 14 shows a section of an aircraft turbine engine featuring blades in accordance with the teachings of the present disclosure.

Moreover, with reference to FIG. 14, in addition to making stator blades for compressor or fan of aircraft turbine engines, the method described above may also be used for making the radial supporting blades 20 which rigidly connects the outer casing 21 of the gas turbine to the tubular casing 22 enclosing the front fan 23 of an aircraft turbine engine.

Each radial supporting blade 20, in fact, comprises a lower coupling root which is structured for being welded or rigidly locking to an annular supporting segment 21a of the outer casing 21 of the gas turbine; an upper coupling head which is structured for being rigidly locked to the tubular casing 22 enclosing front fan 23; and an airfoil-shaped oblong member designed to connect the lower coupling root rigidly to the upper coupling head.

The invention claimed is:

1. A method of producing turbomachine blade that includes a metal lower coupling root, a metal upper coupling head, and a metal airfoil-shaped oblong member connecting the lower coupling root rigidly to the upper coupling head; the airfoil-shaped oblong member comprising a main plate-like element that includes a lower connecting fin cantilevered from the coupling root, an upper connecting fin cantilevered from the coupling head, and a center plate-like body located between the lower and upper connecting fins, and shaped/configured to form an extension of the connecting fins, the method comprising:
    making a first semifinished metal part having a three-dimensional shape that over-approximates a shape of the coupling root of the blade, and including a projecting appendage having a three-dimensional shape that over-approximates a shape of the lower connecting fin;
    making a plate-like second semifinished metal part having a three-dimensional shape that over-approximates a shape of the center plate-like body;
    making a third semifinished metal part having a three-dimensional shape that over-approximates a shape of the coupling head of the blade, and including a projecting appendage having a three-dimensional shape that over-approximates a shape of the upper connecting fin;
    shaping a lower edge of the plate-like second semifinished metal part and a ridge of the projecting appendage of said first semifinished metal part, so that the lower edge of the plate-like second semifinished metal part and the ridge of the projecting appendage of the first semifinished metal part are complementary in shape;
    placing the lower edge of said plate-like second semifinished metal part on the ridge of the projecting appendage of the first semifinished metal part, so that the plate-like second semifinished metal part is aligned locally with the projecting appendage of the first semifinished metal part;
    butt-welding the lower edge of the plate-like second semifinished metal part to the ridge of the projecting appendage of the first semifinished metal part, to connect the plate-like second semifinished metal part and the first semifinished metal part rigidly to each other;
    shaping an upper edge of the plate-like second semifinished metal part and a ridge of the projecting appendage of the third semifinished metal part, so that the upper edge of the plate-like second semifinished metal part and the ridge of the projecting appendage of the third semifinished metal part are complementary in shape;
    placing the upper edge of the plate-like second semifinished metal part on the ridge of the projecting appendage of the third semifinished metal part, so that the plate-like second semifinished metal part is locally aligned with the projecting appendage of the third semifinished metal part; and
    butt-welding the upper edge of the plate-like second semifinished metal part to the ridge of the projecting appendage of the third semifinished metal part, to connect the plate-like second semifinished metal part and the third semifinished metal part rigidly to each other to produce a resulting part; wherein:
    the lower edge of the plate-like second semifinished metal part and the ridge of the projecting appendage of the first semifinished metal part are shaped to extend from a leading edge to a trailing edge of the airfoil-shaped oblong member along a curved, substantially Ω (omega) shaped path, and/or
    the upper edge of the plate-like second semifinished metal part and the ridge of the projecting appendage of the third semifinished metal part are shaped to extend from the leading edge to the trailing edge of the airfoil-shaped oblong member along a curved, substantially Ω (omega) shaped path.

2. The method as claimed in claim 1, comprising, after welding the lower edge of the plate-like second semifinished metal part to the ridge of the projecting appendage of the first semifinished metal part, and the upper edge of the plate-like second semifinished metal part to the ridge of the projecting appendage of the third semifinished metal part, trimming/machining excess material off the resulting part to obtain the coupling root, the main plate-like element, and the coupling head of the blade.

3. The method as claimed in claim 2, wherein trimming/machining the excess material off the resulting part comprises trimming/machining excess material off the first and third semifinished metal parts, to obtain the coupling root and coupling head respectively of the blade.

4. The method as claimed in claim 2, wherein trimming/machining the excess material off the resulting part comprises trimming/machining excess material off long side edges of the plate-like second semifinished metal part, the projecting appendage of the first semifinished metal part, and the projecting appendage of the third semifinished metal part, so as to form the leading edge and trailing edge of the airfoil-shaped oblong member.

5. The method as claimed in claim 2, wherein trimming/machining the excess material off the resulting part comprises trimming/machining excess material off two major faces of the plate-like second semifinished metal part and two major faces of the projecting appendages of the first and third semifinished metal parts, to obtain the main plate-like element of the airfoil-shaped oblong member.

6. The method as claimed in claim 1, wherein said main plate-like element has at least one hollow seat of predetermined shape, substantially in a center of one of two major faces of said main plate-like element; and the method comprises closing an opening of the hollow seat, formed in one of the two major faces of said main plate-like element, with a cover plate, so as to form a closed weight-reducing cavity inside the airfoil-shaped oblong member.

7. The method as claimed in claim 6, comprising trimming/machining excess material off the resulting part, including trimming/machining excess material off two major faces of the plate-like second semifinished metal part and two major faces of the projecting appendages of the first and third semifinished metal parts, to obtain the main plate-like element of the airfoil-shaped oblong member, together with the hollow seat.

8. The method as claimed in claim 6, wherein closing the opening of the hollow seat with the cover plate comprises:
   making a second plate-like element complementary in shape to the opening of the hollow seat in the one of the two main faces of the main plate-like element, the second plate-like element having a thickness of which is less than a depth of the hollow seat;
   placing said second plate-like element on the one of the two main faces of the main plate-like element, so as to seal the opening of the hollow seat; and
   fixing said second plate-like element irremovably to the main plate-like element.

9. The method as claimed in claim 1, making said plate-like second semifinished metal part comprises making a flat metal plate of substantially constant thickness greater than a maximum thickness of the center plate-like body of the blade, and with a contour over-approximating a flat, spread-out contour of the center plate-like body; and twisting and curving said flat plate by a sheet metal forming process, so that a final three-dimensional shape of the center-line plane of the flat plate substantially matches a three-dimensional shape of a centerline plane of the center plate-like body to be made.

10. The method as claimed in claim 9, wherein the thickness of said flat plate over-approximates the maximum thickness of the center plate-like body of the blade to be made.

\* \* \* \* \*